US005648969A

United States Patent [19]
Pasternak et al.

[11] Patent Number: 5,648,969
[45] Date of Patent: Jul. 15, 1997

[54] RELIABLE ATM MICROWAVE LINK AND NETWORK

[75] Inventors: Eliezer Pasternak, Palo Alto; Gideon BenEfraim, Cupertino, both of Calif.

[73] Assignee: Netro Corporation, Palo Alto, Calif.

[21] Appl. No.: 388,110

[22] Filed: Feb. 13, 1995

[51] Int. Cl.$^6$ .............................. H04B 7/24; H04L 12/66
[52] U.S. Cl. ................................ 370/349; 370/474
[58] Field of Search .................... 370/60, 60.1, 94.1, 370/94.2, 97, 95.1, 95.3

[56] References Cited

U.S. PATENT DOCUMENTS

| 4,792,946 | 12/1988 | Mayo | 370/86 |
|---|---|---|---|
| 5,155,726 | 10/1992 | Spinney et al. | 370/85.5 |
| 5,214,648 | 5/1993 | Lespagnol et al. | 370/94.1 |
| 5,412,660 | 5/1995 | Chen et al. | 370/97 |
| 5,434,853 | 7/1995 | Hemmady et al. | 370/60 |

*Primary Examiner*—Wellington Chin
*Attorney, Agent, or Firm*—Skjerven, Morrill, MacPherson, Franklin & Friel

[57] ABSTRACT

A digital radio link suitable for transmitting digital voice or data signals includes an input circuit for ATM or equivalent cells, a processing circuit to encapsulate the input cells received by the input circuit with at least error check bits so that detected error can identify a specific cell or group of cells, a digital transmission circuit for transmitting the encapsulated cells via a wireless link, a reception circuit for receiving encapsulated cells from an opposite side of the digital radio link, a cell decapsulation and error detection circuit connected to said reception circuit and a cell output circuit for connecting said decapsulation circuit to a digital access unit. The system includes structure for allocating more than one type of service, such as low delay service for voice transmission and extensive forward error correction service for data transmission.

34 Claims, 9 Drawing Sheets

Top level cell transmit data flow diagram

A typical city arrangement in which a wireless network of this invention is installed Basic Building blocks of a point-to-point access node of this invention System architecture of a network node of this Invention AU — Access Unit (interface + protocol converter)
EU — Extension Unit (allows external AU connection)
CU — Control Unit (CPU)
IU — Interconnect Unit (bus)
WB — Wideband, >10 Mbps
NB — Narrow Band, <10 Mbps
TU — Trunk Unit
RU — Radio Unit A typical large network node.

Network topology of multiple access nodes of this Invention

Top level cell transmit data flow diagram

Top Level data flow diagram of the Trunk Unit

| VPI/VCI | Service Class | Time Stamp | Update Mode 0-auto 1-by command |
|---------|---------------|------------|----------------------------------|
| 000 | 0 | 20 | 0 |
| 001 | 1 | A3 | 0 |
| 002 | 1 | xx | 1 |
| 003 | 2 | 01 | 0 |
| 004 | F | FF | 0 |
| 005 | 1 | xx | 1 |
| ... | | | |
| FFF | x | FF | 0 |

VPI/VCI - Virtual connection number
x - don't care

VPI/VCI Table

Trunk Unit Block Diagram

Radio Unit Block Diagram

RELIABLE ATM MICROWAVE LINK AND NETWORK

FIELD OF THE INVENTION

This invention relates to the field of telecommunication networks and packet switching and in particular to providing reliable radio-based links for cell-switched networks.

BACKGROUND

Cell-based packet switching networks are becoming widely available. The use of small (i.e. "short") packets of information is preferred in modern digital networks because it enables the efficient mixing of synchronous and asynchronous information, thus providing cost-effective transport of digital voice, LAN data and video. Furthermore, short packets, also known as "cells", can be switched by integrated circuits, allowing quick and economical switching of data in broadband fiber optics networks. This concept is known in the telecom industry as "Asynchronous Transfer Mode" (ATM). ATM networks are commercially available. ATM protocols have been formalized by various international organizations, including the ITU and the ATM Forum. ATM networks were specified assuming the use fiber optics links for transmission. Due to the very low bit error rate of fiber optic links, ATM networks do not provide extra overhead services to guarantee end-to-end delivery of cells. Cells are routed through the network, but if an error occurs (or a buffer overflows), cells may be discarded. The simplicity of "best effort" cell delivery results in a fast and cost effective network.

Typical fiber networks consist of long-haul fiber links interconnecting ATM switches. These switches may be connected by fiber optics links to customer sites, such as office buildings and homes. In the customers' buildings there are network access nodes that combine and convert a user's information to ATM cells for transmission over the network.

Although fiber optics links are becoming the preferred medium for terrestrial links, they are not always available. City regulation, installation costs, long installation time and legal right-of way issues prevent some regions from installing fiber optics links. Some cities may have fiber optics links installed, but owned by a monopoly which a service provider may wish to bypass.

Digital microwave radio links can provide an alternative to fiber optics links between network access nodes and ATM switches. Frequency bands within the range of about 300 MHz to 60 GHz have been allocated for commercial communications. Some microwave links in the millimeter wave region are unlicensed or licensed for low usage fees by regulating governments. Microwave radio links then become a cost-effective and a timely solution to the fast deployment of telecommunication links. There is a drawback, however, to these microwave radio links. Digital microwave radio communication is prone to bit errors, especially under weather-induced fading conditions, such as rain. Some forward error correction, redundancy and retransmission protocol schemes have been devised to improve the performance of microwave links. The problem with these approaches is that they are not directly applicable for ATM traffic. Retransmission is unacceptable because of the delay it introduces. Forward error correction alone does not protect from antenna obstruction or antenna failure. Redundancy by parallel links is too costly and still prone to common link obstructions such as weather-induced signal degradation.

SUMMARY OF THE INVENTION

This invention provides very reliable microwave radio-based communication links for ATM transmission.

In accordance with this invention, a cell-based access network is formed to connect multiple customer sites to a switching center. The network as a whole, and each link in this network, are especially designed to provide reliable service under bit-error conditions.

At the link level, reliable service is provided by subsystems called "Trunk Units" (TU) which process information before and after transit through the error-prone radio link. At the transmit side, the TU divides the information to be transmitted into groups of one or more cells, based on the ATM or similar cell structure of the information. Each cell is assigned a class of service, based on the nature of the information in that cell. Constant bit rate information, such as PCM-encoded voice, is transmitted with minimum delay and only small amounts of forward error correction. Asynchronous information is transmitted with extensive forward error correction, and optionally with retransmission upon error. Thus the network has, in one embodiment, the capability of transmitting three classes of information:

1) Information which requires minimum delay and small amounts of forward error correction;

2) Information which requires forward error correction; and

3) Information which requires forward error correction and retransmission upon error.

Network access systems with two or more radio links are combined with other network access systems or alternate links (microwave relay radios or fiber optics links) from a network. The network, in one embodiment, has a mesh topology, but not necessarily a full mesh. In other embodiments, single or multiple rings are also acceptable topologies. The network links bit rate is higher than the total bit rate of the ATM cells transmitted via these links. The extra bandwidth of the network links allows protection bits to be carried that add protection to the information being transported via the microwave network. The ATM cells entering the network are assigned to one of several grades of service. One of the grades is synchronous. Another grade is synchronous protected. Another one is asynchronous best effort. Yet another service grade is called asynchronous protected. Still other grades may exist.

For asynchronous services, packets are appended by forward error correction ("FEC") check sequence. If a packet passes through a link without error, there is no delay in the passage through that link. If an error is found, the packet is corrected but at the price of a higher delay.

This invention will be more fully understood in conjunction with the following detailed description taken together with the drawings.

DRAWINGS

DETAILED DESCRIPTION

Figure 1:
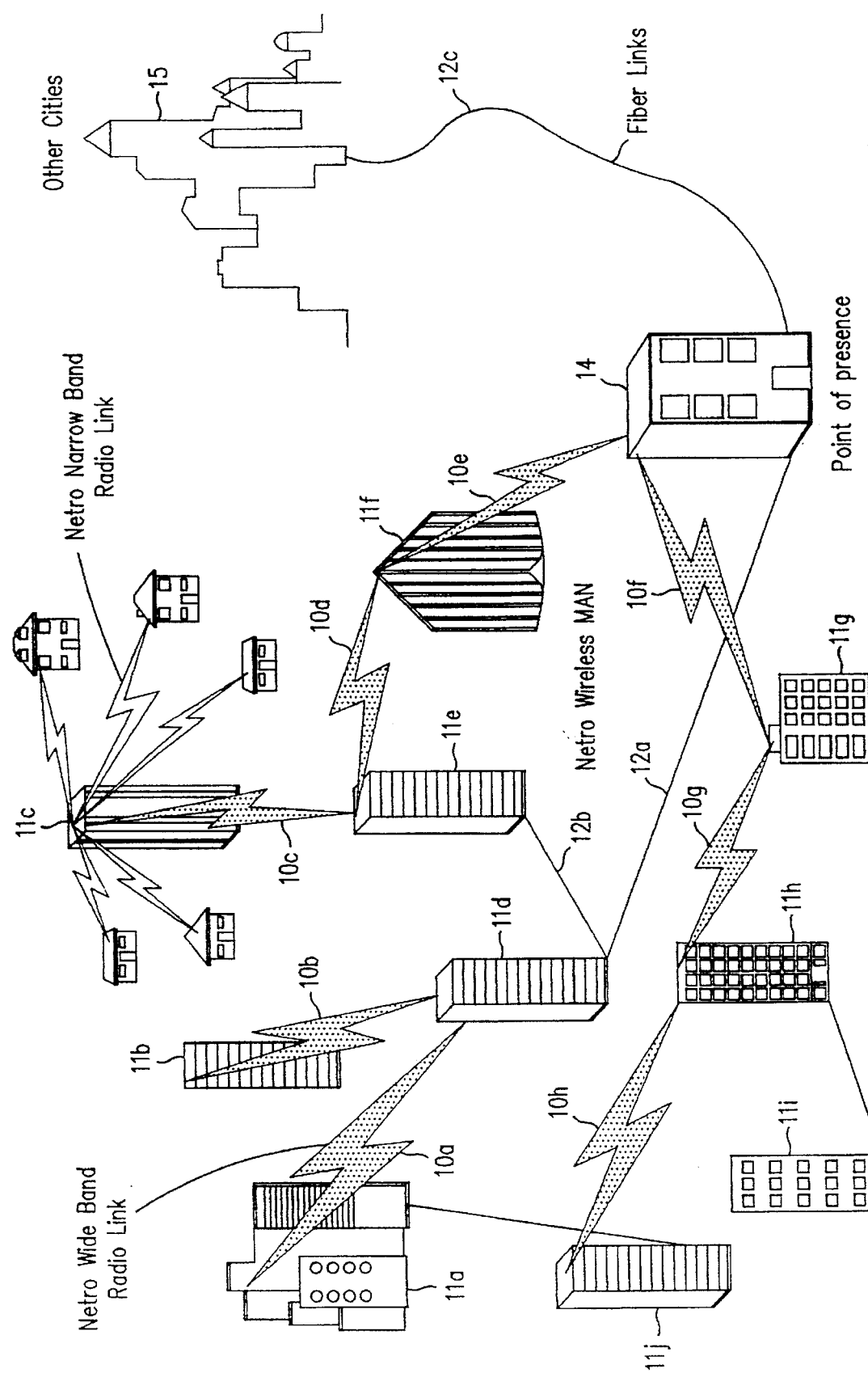
FIG. 1 shows a wireless network of a type suitable for use in a city.

A metropolitan area network in accordance with this invention is shown in FIG. 1. The dark arrows 10a through 10h represent wireless links with radio transceivers (not shown) at each end. These wireless links connect buildings shown as 11a through 11j in a city to a central office 14 also called a "point of presence". The point of presence 14 ("POP") includes ATM switches, frame relay datacom (X.25) switches and voice switches. This invention allows exchange of digital voice and data between these switches and makes available ATM developed for fiber optics for transmission by digital radio. A network allows the extra benefits of relaying information from remote stations such as at location 15, even if the remote stations have no direct line of sight to the point of presence 14, as well as providing redundant links, and the ability to concentrate information from multiple nodes.

Figure 2:
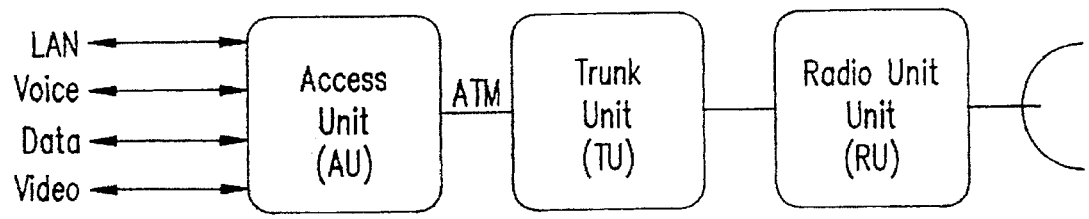
FIG. 2 shows the basic building blocks of a point-to-point access node of this invention.

The minimum access node for a point-to-point link of this invention is depicted in FIG. 2. This minimum system is sufficient if the advantages of a full network are not required. An access unit (AU) is capable of interfacing with a variety of local interfaces. In the AU, the signals from these interfaces are all converted to ATM cells, which are delivered to a trunk unit (TU). A suitable AU can be purchased today from a large number of vendors, for example Stratacom of San Jose Calif. An appropriate AU can also be designed as a set of electronic cards and software, as briefly described below. The ATM cells are delivered to the TU. The TU includes the hardware and the software that can identify cell boundaries, encapsulate the cells, add FEC and other overhead, including overhead that describes the type of service the link should provide to the network, and other cell processing functions as described below. The TU is a key element of this invention. The TU outputs a serial bitstream to the radio unit (RU) which is placed on the outside wall or roof of a building, attached to a dish antenna. A twisted pair cable, coax or fiber optics link connects the RU to the TU. The RU modulates the bitstream and transmits it at the desired microwave frequency. This system operates normally in a full-duplex mode; thus the RU also receives a bitstream from an opposite access node and delivers this bitstream to the TU. The TU processes the cells in this received bitstream, including error correction and dropping of cells that are not recoverable. The TU delivers good cells to the AU and logs or reports cell loss to a control system (a microprocessor circuit not depicted in FIG. 1 but shown as control units ("CU") 43a and 43b in FIG. 4).

Figure 3:
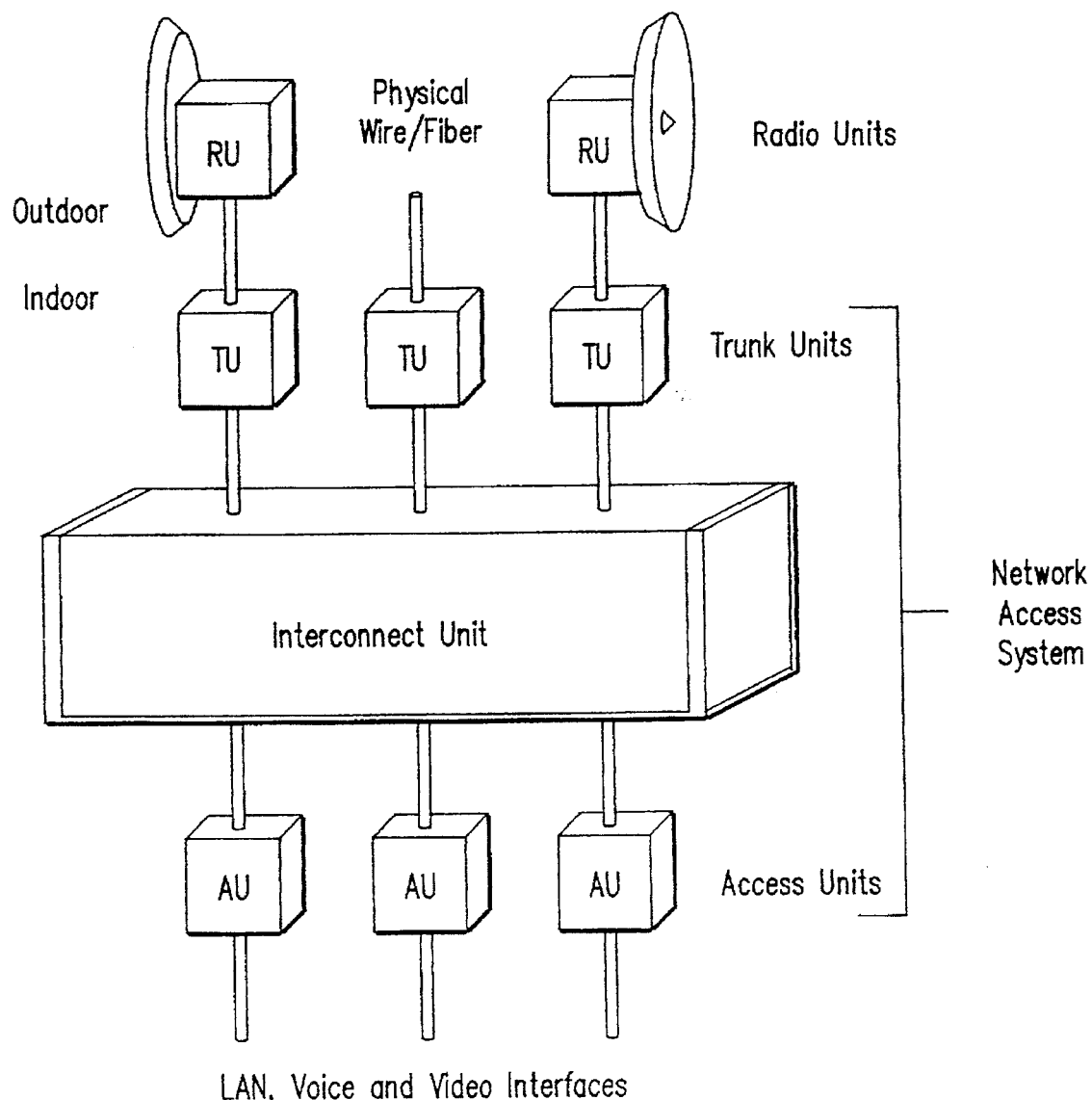
FIG. 3 shows the system architecture of a network node in accordance with this invention.

For a network, more than a single RU is required per access node. A general block diagram of such a system is depicted in FIG. 3. Multiple AUs, RUs and TUs are shown. A new block, an interconnect unit (IU) is provided. The IU is essentially a cell-switch for exchanging cells among the TUs and AUs. The IU may be implemented as a backplane, as is commonly done by existing ATM switching and concentrating equipment. A cell switching matrix can be added to the system. Such a cell switching matrix could be connected to all plug-in electronic cards via a backplane. Such an implementation is available using the Prisma 16×16 Switch On A Chip from IBM Microelectronics, Research Triangle Park, North Carolina (800) 426-3333. Such a chip is currently the preferred way for implementing the interconnect unit of FIG. 3. The IU function is then distributed among the modules (AUs and TUs) and implemented in the form of a bus access chip set. A control entity (e.g. a network management system 49 ("NMS")), external to this system, may establish communications with a local microprocessor, that can use the backplane to instruct each unit connected to the IU which cell is to be routed to which other unit connected to the IU, based on a connection identification number (VPI/VCI in ATM terminology). As shown, a TU can also be connected to copper or fiber optics links if such are available, where there is an economical advantage of doing so. In the example of FIG. 1, some of the links are of fiber optics.

Figure 4:
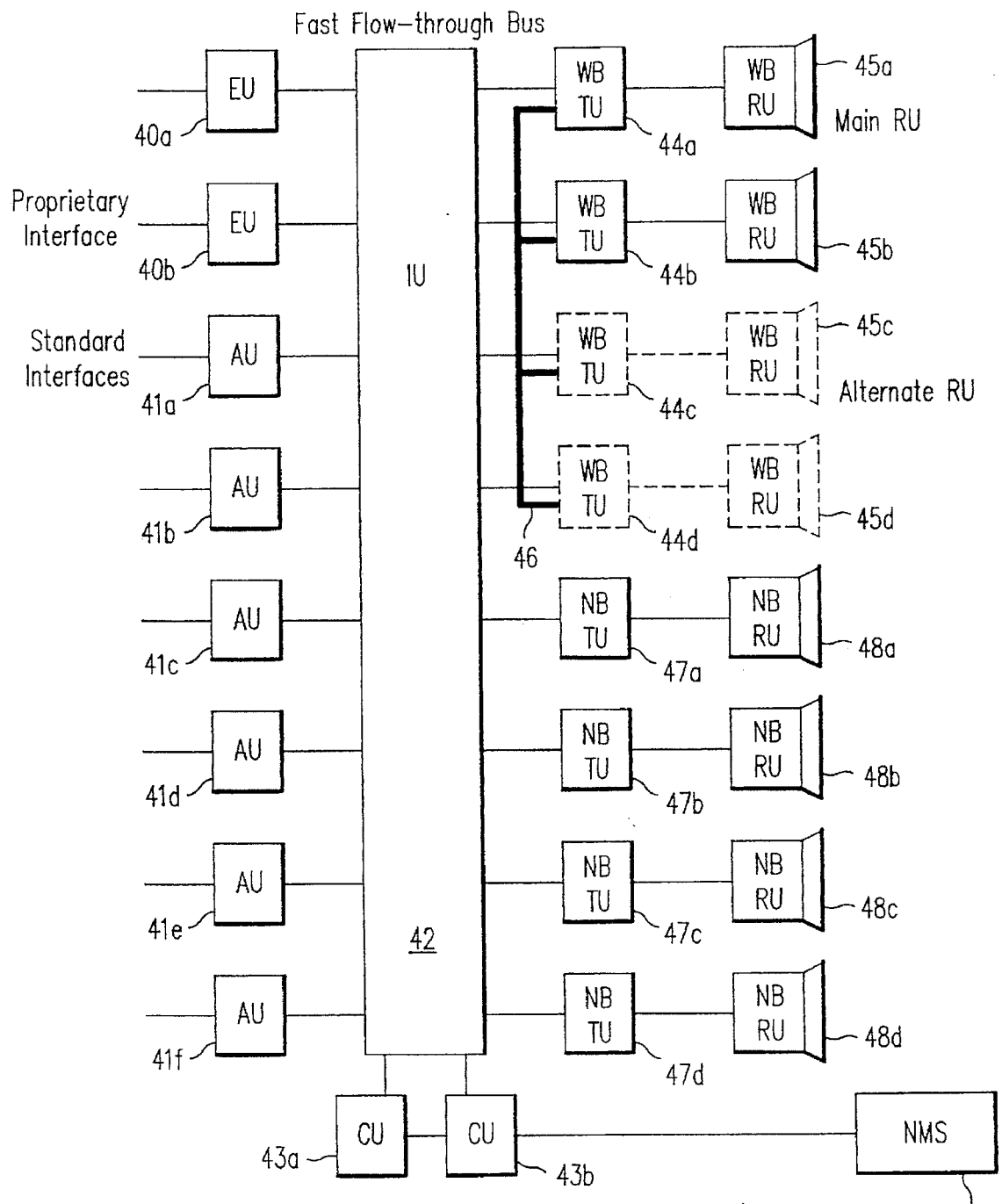
FIG. 4 illustrates a typical network node for use with this invention.

FIG. 4 depicts a preferred embodiment of a large node. An extension unit (EU), shown as 40a and 40b, is similar to an AU, except that the EU includes a proprietary interface to allow maximum economy of connection with other AUs, including AUs without ATM capabilities. The TUs, AUs and EUs are all plug-in electronic cards to a backplane, with a distributed IU as mentioned above. The RUs are outdoor units, as mentioned above. Control units, CU, shown as 43a and 43b, are typically microprocessor cards with appropriate connectivity to all other cards in the backplane, as is customary in the communications system art. The CUs 43a and 43b control the system operation and communicate with external control centers such as a network control center or a user console. Standard, existing software stacks can be used for the CU control functions, such as SNMP, CMIP and TMN. The TU/RU pairs are of two types: wide band (WB), for example 34 Mbps, and narrow band (NB) for example (2 or 8 Mbps). The wideband TU/RU 44a through 44d and 45a through 45d can be used as the backbone of the network of this invention, or as point-to-point links. The narrowband TU/RU pairs 47a through 47d and 48a through 48d are used mostly for point-to-point access and as tributary access to the backbone. For redundancy purpose, two TU/RU pairs may be designated as "Main", and two as "Alternate". The alternate units allow repair and network node modifications, such as addition of backbone nodes, without interruption to service. Since the backbone bandwidth is higher than the local traffic of each node in most situations, a drop/insert capability is designed in, shown as a "fast flow through bus" 46. Bus 46 allows data to bypass the interface unit (IU) to thus speed up the system in appropriate circumstances. The TUs look at the VPI/VCI of each cell and drop (pick up) only those cells with a VPI/VCI on the list of a local look-up table stored in memory. This table is maintained and updated by local circuitry, in conjunction with external network management. A dropped cell is not retransmitted to the next network node. Instead, it is replaced by an idle cell. Cells for transmission are kept in a TU queue and are sent whenever an idle cell is encountered, replacing the idle cell. The network management or local flow control techniques can ensure fair distribution of bandwidth for packet transmit opportunity. As a minimum, the sum of tributary pick transmission rates can by allocated for the backbone, obviating the need for such flow control, at the expense of system bandwidth utilization efficiency.

Figure 5:
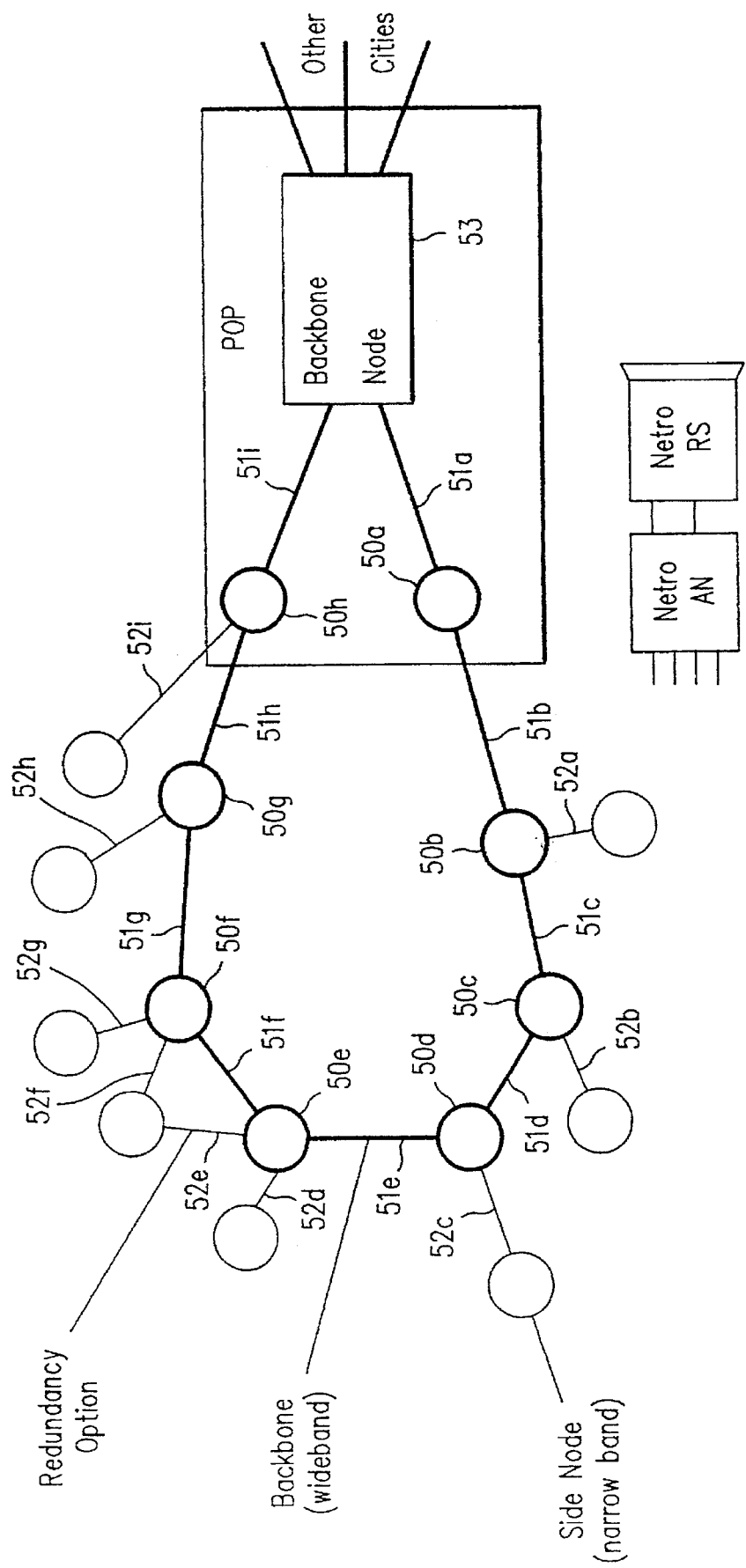
FIG. 5 illustrates the network topology of multiple access nodes in accordance with this invention.

FIG. 5 depicts the topology of the metropolitan area network (MAN) or "Network" of this invention. Access nodes 50a through 50h, such as the node of FIG. 2, are depicted as circles 50a through 50h. Bold lines 51a through 51i depict backbone radio links. Thin lines 52a through 52i depict tributary radio links. Since the radio links are full duplex, information travels in both directions along the backbone. The network is ATM based, and since ATM is connection-oriented, cells are dropped and inserted at each of nodes 50a through 50h, as described above. If a backbone link fails, data can be routed the opposite direction. At the POP 53, two wideband RU/TU serve each side of the backbone. Here, all bandwidth is sent to the TU and then to AU and eventually to the external switching equipment. The "backbone node" 53 in FIG. 5 includes both the access node of this invention, as well as the external switching equipment. Fiber links to other cities are not normally connected directly to the access node of the MAN of this invention.

Figure 6:
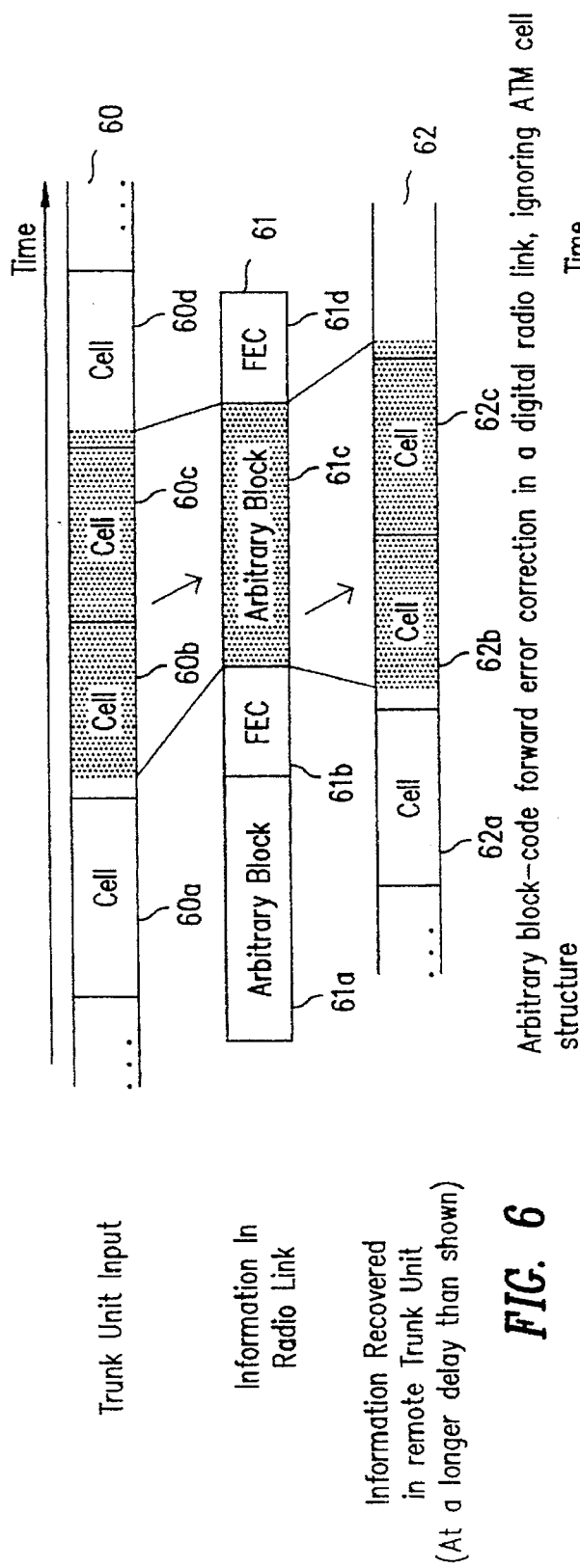
FIG. 6 illustrates arbitrary block-code forward error correction in a digital radio link, ignoring ATM cell structure.
Figure 7:
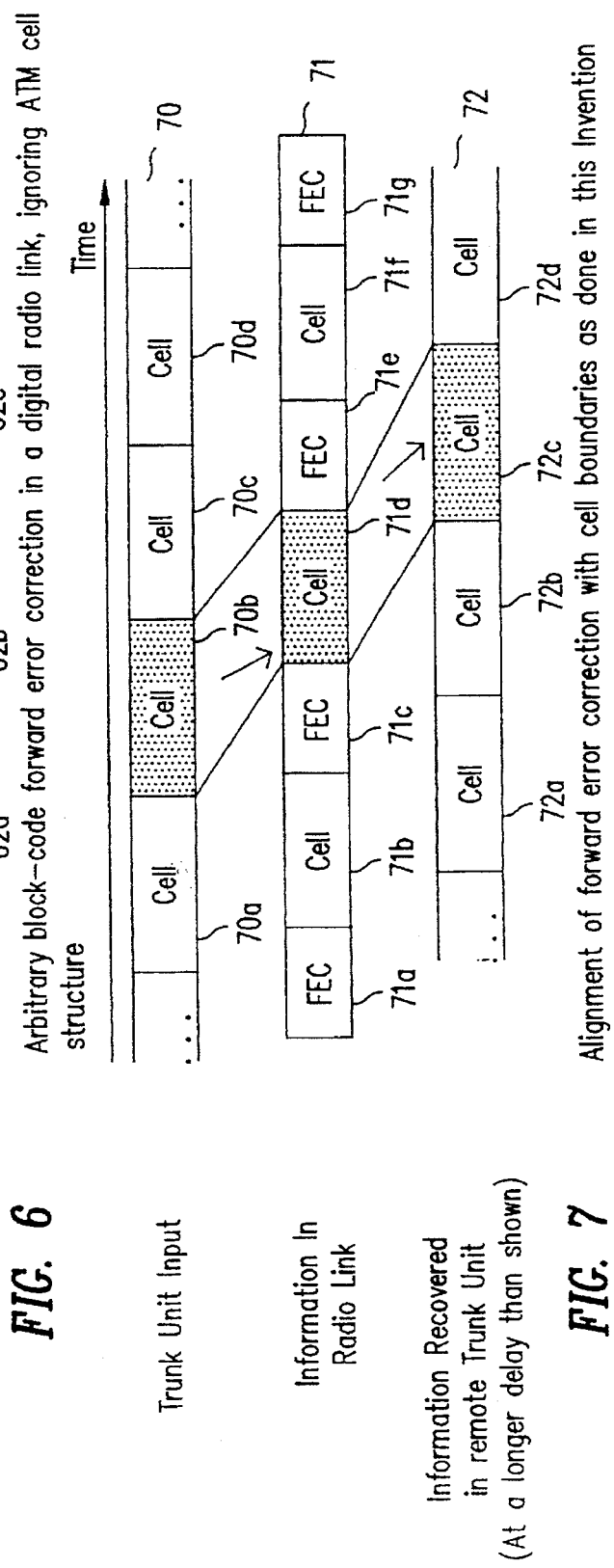
FIG. 7 illustrates the alignment of forward error correction with cell boundaries in accordance with this invention.

FIG. 6 shows how ATM traffic might be handled by digital radios of the present art. A serial bitstream 61 containing ATM cells is cut arbitrarily to blocks 61a, 61c, for example, of a fixed size (this is called block coding), and FEC bits are appended. The information is transmitted over the radio link at a slightly higher bit rate to allow for the FEC overhead. In the receiver, the errors are corrected, the FEC bits 61b, 61d removed, and the original bit rate restored. This mode of operation is reasonable if the transmission needs to maintain transparency to any bit protocol, and therefore this mode is provided as an option in systems built in accordance with this invention. However, to provide a more reliable link, as well as to provide better statistics of cell losses, it is advantageous to align block coding with the cell boundaries, if such boundaries exist in the information. This is depicted in FIG. 7, which shows the method of FEC encoding in accordance with this invention. The cell processing in accordance with this invention may differ from a simple first-in-first-out transmission. Cells may be dropped due to uncorrectable error. Cells may also be delivered in a different order than sent, as long as cells of the same virtual connection are delivered in order. Changing the transmission of cells order is desirable for priority transmission, allowing voice-carrying cells to be delivered to the destination with minimal, low delay FEC, and to perform extensive forward error correction on data-carrying cells. Furthermore, it may be desirable to retransmit cells, to provide a more reliable or even guaranteed delivery service to connections not sensitive to delay, as is customary with non-ATM link layer protocols. The processing done for cells in this invention is described below in configuration with FIGS. 8 and 9.

Figure 8:
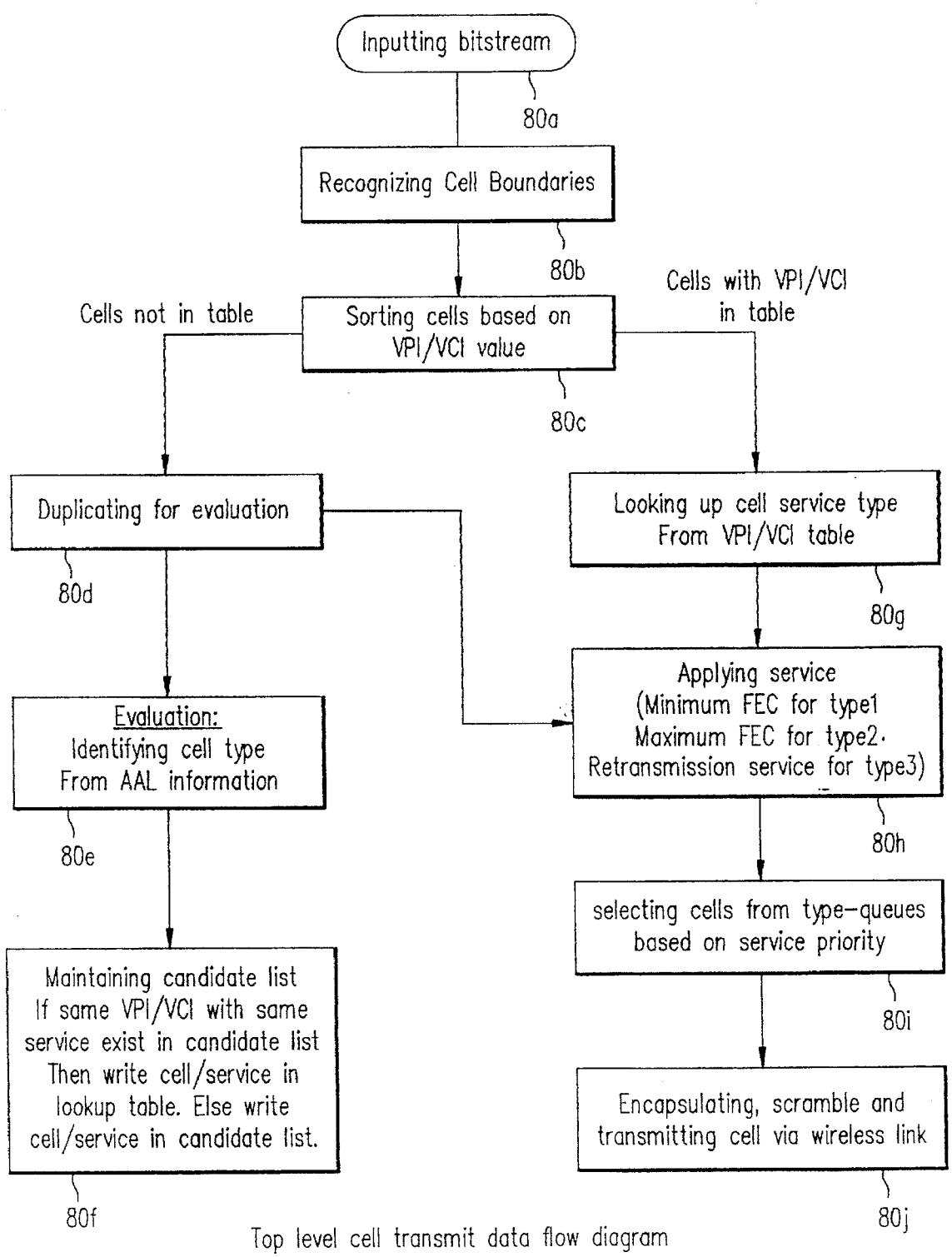
FIG. 8 illustrates the top level cell transmit data flow diagram.

FIG. 8 shows a data flow diagram (DFD) of the transmit side. This DFD can be implemented by a combination of hardware and firmware, using a RISC processor for running some of the algorithms, dual port RAM for storage and manipulation of the various tables, and RAM devices for cell storage. Gate arrays can be used to control various queues. A simple transmit side may have all of its virtual connection identifiers (VPI/VCI in ATM terminology) set up by a management system. A look-up table would list for each VPI/VCI the type of service to be performed. The DFD of FIG. 8 describes a more advanced solution, in which the content of these tables is created automatically. This can be done by observing the nature of each cell. For example, an ATM cell of a constant bit rate, such as some types of voice applications, carries inside the cell adaptation information as defined by the ATM adaptation layer 1 (AAL1). An AAL1 subcell (protocol data unit or "PDU") has an SAR-PDU header of eight bits, including a 3-bit CRC field. By observing a valid CRC field, and verifying that no valid 10-bit CRC of AAL3/4 exists, the cell can be assumed to be AAL1. To avoid a false decision based on random bit pattern resembling AAL1 (it could be, for example, AAL5 PDU which in many instances contains no headers in the AAL PDU and to which the system defaults if the cell is neither AAL1 or AAL3/4), each VPI/VCI is examined for two or more cells. In the embodiment of FIG. 8, two cells of the same VPI/VCI are required to decide the service type. Similar procedures can be developed for automatic identification of proprietary cell-based protocols, which exist in some current ATM-like switches that have been developed before ATM formats have been standardized.

Figure 9:
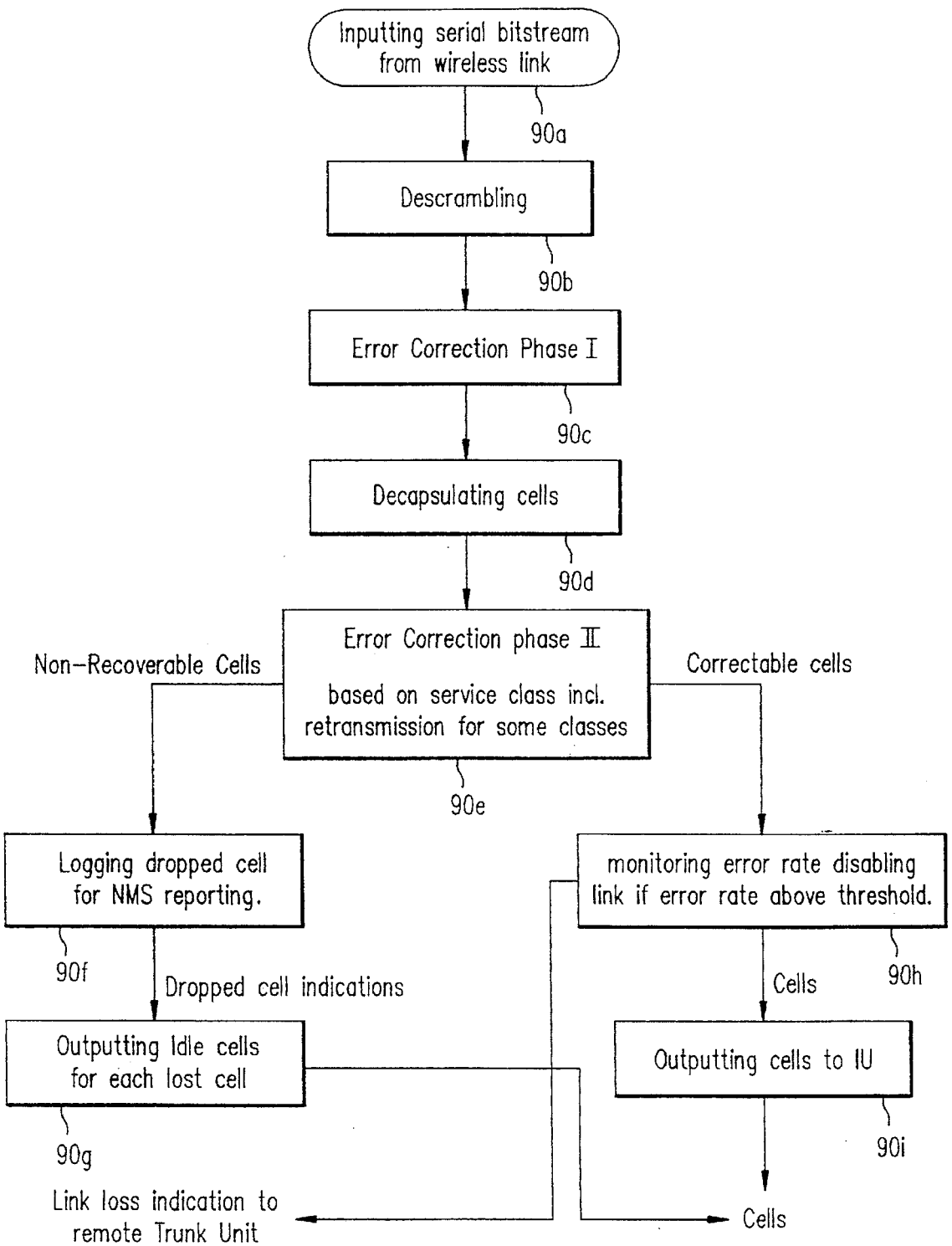
FIG. 9 illustrates the top level data flow diagram of the trunk unit in accordance with this invention.

The receive side DFD is shown in FIG. 9. Error correction may take two phases; phase I is global, done to all cells regardless of service type while phase II is more extensive, and is done selectively to critical cells. Phase II may require extra bandwidth, reducing the bandwidth available for information. The decision as to how much phase II FEC to perform depends on a particular application and the bandwidth/performance trade-off. Both phases of FEC can be block codes, such as BCH and Reed Solomon, or a concatenation of convolutional code for phase I and block code for phase II. Furthermore, a retransmission protocol can be established for some connections. Since these radio links are short, normally less than 5 kilometers, the round trip delay is about 30 microseconds, which at 34 Mbps (megabits per second) is less than four cells. Thus cells can have a second chance, if so desired, with a sliding window protocol only four cells deep. The window may actually be a bit larger due to processing delay, but the absolute physical limit is small enough that retransmission is a practical option. An important feature of this invention is the transmission of error performance indications from the receive side back to the transmit side of the opposite node. This indication can be done by assigning bits as a part of the cell encapsulation overhead.

Figures 10, 11:
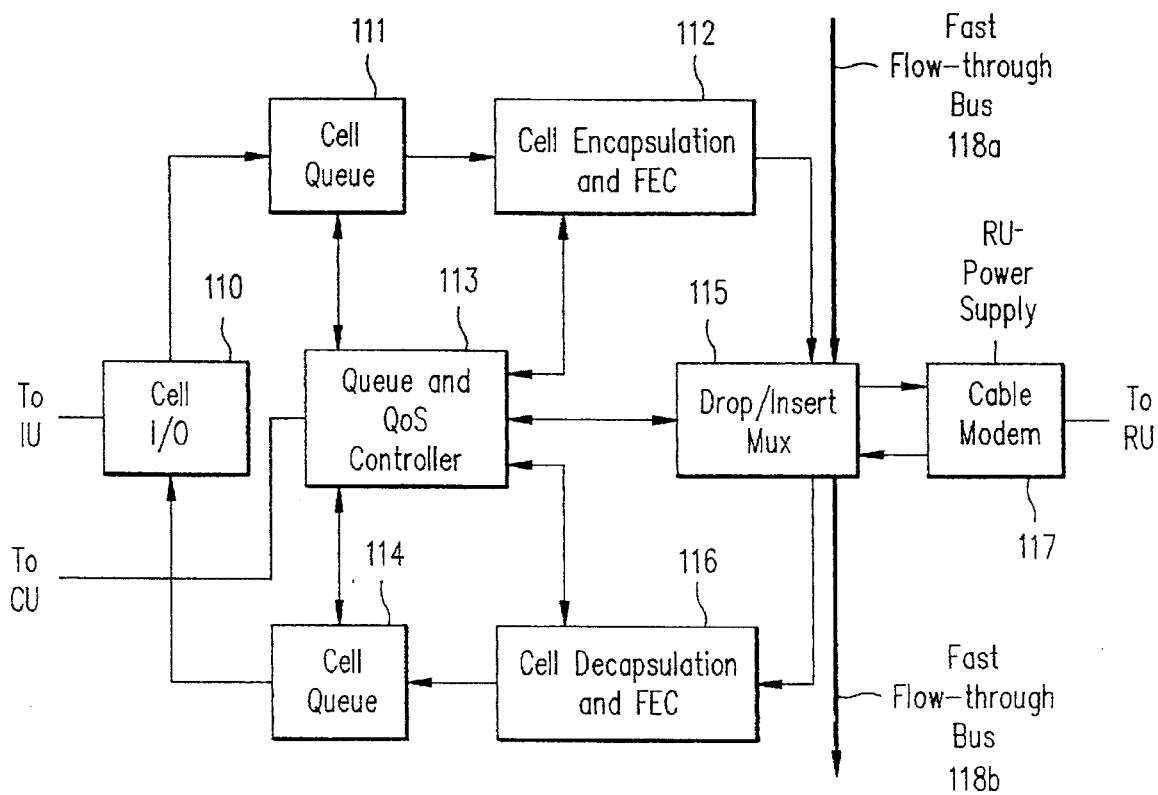
FIG. 10 illustrates the VPI/VCI table in accordance with this invention.
FIG. 11 is a block diagram of one trunk unit suitable for use with this invention.

An example of a VPI/VCI table for automatic updating is shown in FIG. 10. The first column shows VPI/VCI in hexadecimal format. The second column shows service class as assigned manually or automatically. Unassigned VPI/VCI are marked by a class F that represents a connection not yet encountered for a long period of time. The third column represents a time stamp, that is periodically incremented, unless the same VPI/VCI cell is read, in which case the time stamp is reset. An FF represents an expired, or never encountered connection. Although this table lists all of the possibilities of VPI/VCI combinations with 12-bits, there are 24 bits maximum in a standard ATM UNI (User-Network Interface); thus one strategy may be to erase expired connections and to keep a rather small table of, say, up to 256 rows with active connections. In a preferred embodiment, this is implemented by first having a multi stage look-up table that checks if a VPI may exist in a subset of the memory space, and then point to the table entry itself. Similar techniques have been used for hardware-based, self-learning bridges and IP routers.

The above DFDs are implemented as a combination of hardware and firmware residing in the TU. The hardware is shown in FIG. 11. A Cell I/O 110 circuit receives cells from the IU and places them in a queue (RAM) 111. This I/O circuit may consist of an off-the-shelf ATM switching integrated circuit, or made of an ASIC. A queue and QoS Controller 113 is a fast processor (e.g. RISC) that manages the queues, hosts the look-up tables as external or on chip memory, and performs the service identification procedures. Processor 113 also controls the cell encapsulation and FEC block 112. The queue controller and QoS controller 113 takes cells and places them in various queues in cell queue 111 to reflect the type of service which is to be given to the cells. For example, cells which reflect voice data will be placed in a queue in cell queue 111 which will be given low delay and minimal error correction. On the other hand, cells representing data will be placed in a queue in cell queue 111 which will have extensive forward error correction. Alternatively, a queue can be provided for retransmission of cells which are transmitted with an unacceptable level of errors.

The VPI/VCI table of FIG. 10 is implemented in the queue and QoS controller 113 in FIG. 11.

Processor 113 is connected to the Control Unit ("CU") by appropriate interconnection circuitry. The CU provides system-level control, which includes external instructions to update the VPI/VCI table, as well as drop/insert tables in the drop/insert mux 115. The transmitted cells are combined in a drop/insert mux 115 that sends the cells to the cable modem 117. This can be a copper-FDDI of copper ATM baseband modem, which is essentially a line driver. Such devices are commercially available. The modem 117 sends the data to the RU for radio transmission. Data received from the RU by the modem 117 is first sent to the drop/insert mux 115, that in conjunction with the fast flow-though bus 118a, 118b decides how to route cells. The drop/insert mux 115 also performs phase I FEC correction, to improve the chance of correct routing decisions on cells not fully corrected. The cells are then decapsulated by an ASIC combined with phase II FEC, and are placed in a queue for output to the IU.

Figure 12:
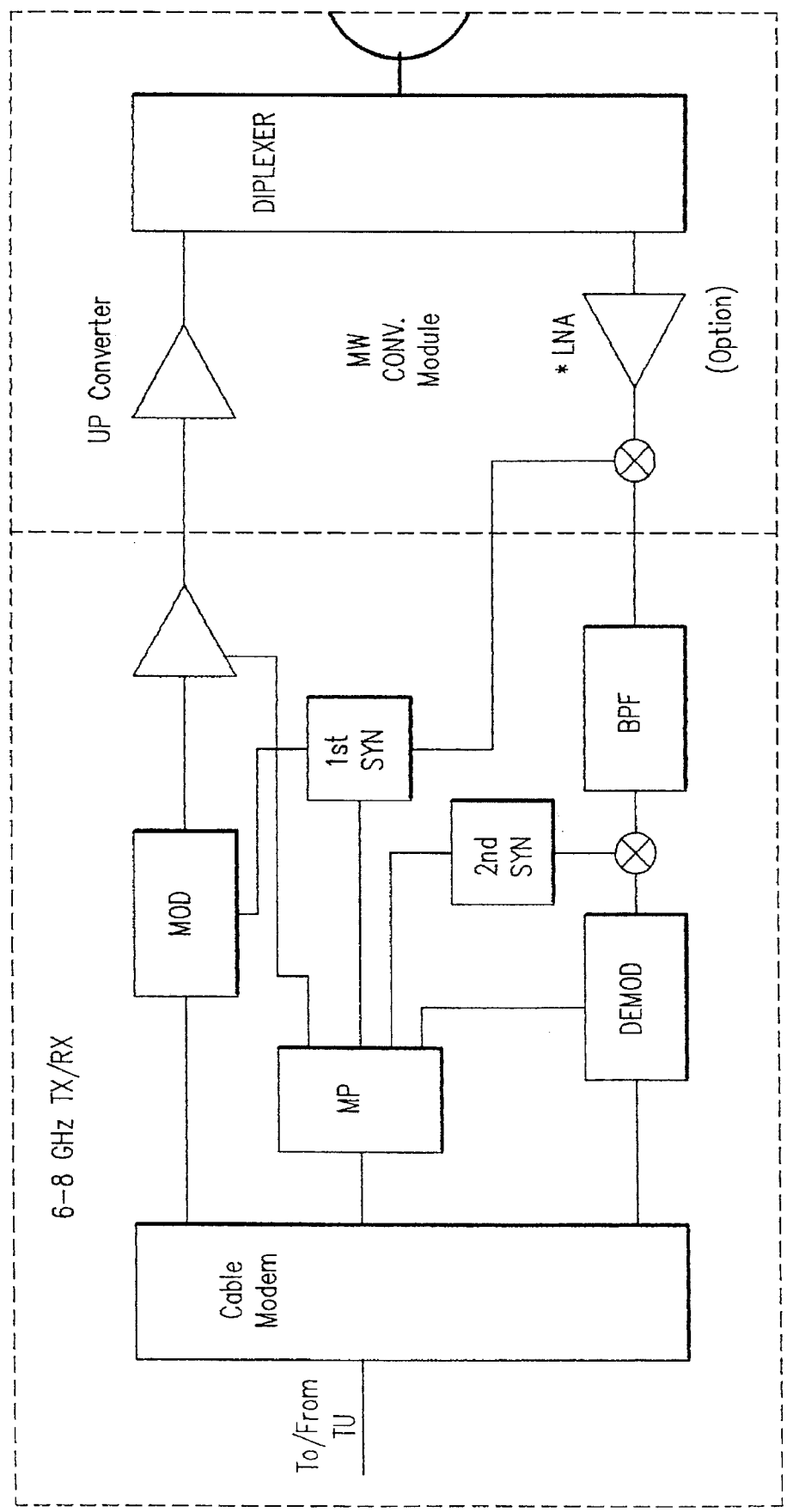
FIG. 12 is a block diagram of one radio unit suitable for use with this invention.

FIG. 12 depicts an RU. The RU has a cable modem, similar to the TU. A local microprocessor (MP) monitors operation, voltages, and synthesizers function. A modulator converts the bitstream to transmit RF signal at a microwave frequency, such as roughly 6 GHz. This can be an FSK or QPSK modulator. The modulator frequency is controlled by a synthesizer to set the precise frequency. This signal is then up-converted to the desired frequency, such as 38 GHz. A preferred converter is a frequency multiplier by a factor N. A diplexer allows simultaneous transmit/receive in the same antenna. The receive signal goes through double conversion and demodulation and then is sent to the cable modem and finally to the TU.

Other embodiments of this invention will be obvious to those skilled in the art in view of this disclosure.

We claim:

1. A digital radio link including:

an input circuit for ATM or equivalent cells from a digital access unit;

a cell processing circuit, connected to said input circuit, that encapsulates said input cells with at least error check bits so that a detected error can identify a specific cell or group of cells;

a digital transmission circuit connected to said processing circuit for transmitting said encapsulated cells via a wireless link;

a reception circuit for receiving encapsulated cells;

a cell decapsulation and error detection circuit connected to said reception circuit; and a cell output circuit for connecting said decapsulation circuit to a digital access unit.

2. The digital radio link of claim 1 wherein said cell processing circuit further includes:

means for allocating more than one type of service, such as low delay for voice and extensive forward error correction for data.

3. A metropolitan area network comprising:

at least two digital radio links of claim 1; and drop/insert means for separating local passing cells from flow through cells.

4. A digital radio link as in claim 1 wherein said input circuit, said cell processing circuit, said transceiver circuit, said reception circuit and said output circuit are at the same terminal.

5. A digital radio link as in claim 1 wherein said input circuit, said cell processing circuit and said digital transmission circuit are at one terminal and said reception circuit, said cell decapsulation and error detection circuit and said cell output circuit are at a second terminal.

6. Structure as in claim 1 wherein said cell processing circuit comprises a trunk unit, said trunk unit including:

means for identifying cell boundaries, means for encapsulating cells; and means for adding forward error correction to the cells.

7. Structure as in claim 6 including means for outputting from said cell processing circuit a bit stream to the digital transmission circuit.

8. Structure as in claim 7 wherein said means for transmitting the bit stream to the digital transmission circuit comprises a selected transmission medium.

9. Structure as in claim 8 wherein said selected transmission medium is one of a twisted pair cable, a coaxial cable and a fiber optics link.

10. Structure as in claim 6 including an interconnect unit for interconnecting a plurality of input circuits and trunk units to enable such input circuits and trunk units to exchange cells among themselves.

11. Structure as in claim 10 including a network management system for instructing each input circuit and trunk unit connected to the interconnect unit as to the destination of each cell being routed through the interconnect unit.

12. Structure as in claim 11 wherein said instruction to each unit connected to the interconnect unit is based upon a connection identification number.

13. Structure of claim 12 wherein said identification number includes a signal denoted as VPI/VCI associated with each cell (in ATM terminology).

14. Structure as in claim 13 including means for identifying the VPI/VCI of each cell and for dropping or picking up only those cells with a VPI/VCI on a list stored in memory in the trunk unit.

15. Structure as in claim 14 including means for replacing an idle cell with an information-bearing cell, said information-bearing cell being maintained in a queue from which information cells are to be provided for transmission in place of an idle cell whenever an idle cell is encountered.

16. Structure as in claim 6 including a cell switching matrix for allowing one input circuit to exchange cells with another input circuit.

17. Structure as in claim 16 including means for interconnecting a plurality of input circuits thereby to allow redundancy.

18. Structure as in claim 17 including a fast flowthrough bus for allowing data to bypass the interface to thus speed the system in appropriate circumstances.

19. Structure as in claim 1 wherein said cell decapsulation and error detection circuit includes:

means for identifying cells in a received bit stream;

means for detecting errors in cells; and means for dropping cells that are not recoverable.

20. Structure as in claim 19 including means for delivering good cells to the cell output circuit unit.

21. Structure as in claim 20 including means for reporting cell losses to a control system.

22. Structure as in claim 21 wherein said control system includes a microprocessor circuit.

23. Structure as in claim 1 wherein said digital access unit is capable of interfacing with a variety of local interfaces.

24. A cell transmission/reception process including:
inputting cells;
encapsulating said cells by forward error correction bits;
transmitting these cells;
receiving cells from an opposite side of a link;
decapsulating these cells;
dropping or marking "invalid" cells with errors; and
outputting the non-dropped cells.

25. A digital radio terminal in a wireless link including:
an input circuit for inputting ATM cells or equivalent cells from a digital access unit;
a transmit processing circuit connected to said input circuit that encapsulates said input cells into data blocks containing also at least error check bits so that errors on the link could be detected;
a digital transmission circuit connected directly or via cables to a wireless transceiver;
a reception circuit connected to said cables for receiving encapsulated cells from a digital radio terminal at the opposite side of the radio link;
a cell decapsulation and error detection circuit connected to said reception circuit;
a cell processing circuit connected to said cell reception circuit including means for recognizing cell boundaries and rejecting or marking for rejection whole cells upon received indication of errors; and
a cell output circuit for connecting said cell processing circuit to a digital access unit.

26. The digital radio terminal of claim 25 wherein said cell processing circuit further includes means for encapsulating one or more cells on cell boundaries.

27. The digital radio terminal of claim 26 wherein said cell processing circuit further includes:
means for retransmitting cells upon reception of an error indication from a terminal at the opposite side of the link.

28. The digital radio terminal of claim 27 wherein said cell processing circuit further includes:
means for allocating more than one type of service, such as low delay for voice and extensive forward error correction for data.

29. The structure of claim 28 further including two stages of error correction, wherein an error correction phase 1 performs the same level of error correction on all cells, and phase 2 performs selective error correction based on the class of service of each cell.

30. The structure of claim 29 wherein said means for allocation of service include means for automatically constructing a VPI/VCI lookup table.

31. The structure of claim 30 in which said means for automatically constructing includes means for identification of cell type by observing the ATM adaptation layer (AAL) information.

32. A metropolitan area wireless network node comprising at least two digital radio terminals of claim 25 and further including an interconnect unit with cell switching capability, connected to said access units and said transmit and receive circuit so that said interconnect unit can switch ATM or similar cells among all said units and circuits.

33. A cell transmission/reception process including:
inputting cells;
encapsulating said cells by forward error correction bits;
transmitting these encapsulated cells on a link;
receiving cells from an opposite side of a link;
decapsulating these cells;
delineating cell boundaries;
dropping or marking "invalid" cells with errors; and
outputting the non-dropped cells.

34. A digital radio system including:
a plurality of input circuits for ATM or equivalent cells from a digital access unit;
a plurality of cell processing circuits, each cell processing circuit being connected uniquely to a corresponding input circuit, each cell processing circuit being capable of encapsulating input cells with at least error check bits so that a detected error can be pinpointed to a specific cell or group of cells;
a plurality of digital transmission circuits, each digital transmission circuit being connected to a corresponding one of said processing circuits for transmitting encapsulated cells via a wireless link;
a plurality of reception circuits for receiving encapsulated cells from an opposite side of a digital radio link;
a plurality of cell decapsulation and error detection circuits, each cell decapsulation and error detection circuit being connected uniquely to a corresponding one of said plurality of reception circuits; and
a plurality of cell output circuits, each cell output circuit connecting a corresponding one of said decapsulation and error detection circuits to a corresponding digital access unit.

* * * * *